(12) United States Patent
Trafford

(10) Patent No.: US 7,196,971 B2
(45) Date of Patent: Mar. 27, 2007

(54) METHOD AND APPARATUS FOR DAMPING AN ULTRASONIC TRANSDUCER SUITABLE FOR TIME OF FLIGHT RANGING AND LEVEL MEASUREMENT SYSTEMS

(75) Inventor: Mark Trafford, Peterborough (CA)

(73) Assignee: Siemens Milltronics Process Instruments, Inc., Ontario (CA)

( * ) Notice: Subject to any disclaimer, the term of this patent is extended or adjusted under 35 U.S.C. 154(b) by 81 days.

(21) Appl. No.: 10/764,613

(22) Filed: Jan. 26, 2004

(65) Prior Publication Data
US 2005/0162975 A1   Jul. 28, 2005

(51) Int. Cl.
*H04R 17/00* (2006.01)

(52) U.S. Cl. ............... 367/176; 367/908; 367/162; 73/290 V

(58) Field of Classification Search ............... 367/162, 367/176, 908; 73/290 V
See application file for complete search history.

(56) References Cited

U.S. PATENT DOCUMENTS

| | | | |
|---|---|---|---|
| 4,183,007 A * | 1/1980 | Baird .................. 367/908 |
| 4,373,401 A * | 2/1983 | Baumoel .............. 73/861.18 |
| 4,908,094 A | 3/1990 | Jones et al. |
| 4,938,827 A | 7/1990 | Leach et al. |
| 5,121,628 A * | 6/1992 | Merkl et al. .......... 367/908 |
| 5,457,352 A * | 10/1995 | Muller et al. ......... 310/327 |
| 5,488,957 A | 2/1996 | Frey et al. |
| 5,647,939 A | 7/1997 | Gee et al. |
| 5,744,898 A | 4/1998 | Smith et al. |
| 5,834,687 A | 11/1998 | Talbot et al. |
| 5,918,354 A | 7/1999 | Ikegami et al. |
| 6,182,341 B1 | 2/2001 | Talbot et al. |
| 6,488,992 B1 * | 12/2002 | Boerio et al. ........ 427/447 |

* cited by examiner

*Primary Examiner*—Ian J. Lobo
(74) *Attorney, Agent, or Firm*—Merchant & Gould P.C.

(57) ABSTRACT

A method and apparatus for damping an ultrasonic transducer suitable for time of flight ranging and level measurement systems. The ultrasonic transducer comprises a damping component which absorbs vibrations in the transducer to reduce the ringing effect. The damping component is subjected to plasma etching to produce a surface which readily bonds to component(s) of the transducer. According to one aspect, the damping component is formed from an inert elastomer, such as silicone rubber, and the transducer component is made of stainless steel.

6 Claims, 2 Drawing Sheets

METHOD AND APPARATUS FOR DAMPING AN ULTRASONIC TRANSDUCER SUITABLE FOR TIME OF FLIGHT RANGING AND LEVEL MEASUREMENT SYSTEMS

FIELD OF THE INVENTION

The present invention relates to time-of-flight ranging systems and level measurement systems, and more particularly to a method and apparatus for damping a transducer for a time of flight ranging system and a level measurement system.

BACKGROUND OF THE INVENTION

The transducers utilized in ultrasonic based time of flight ranging systems and level measurement systems experience ringing which results from the continuation of vibrations that occur after the excitation pulse or input is ended. The ringing gives rise to a characteristic known as blanking. The blanking characteristic makes it difficult, if not impossible, to measure echo pulses, or distances close to the transducer, because of the ringing effects.

Better damping to decrease the ringing allows the blanking distance to be reduced. This in turn provides the level measurement system the capability to provide a greater measurement range, i.e. ranging from the target surface in the vessel to a point in close proximity to the transducer. Reduced ringing also results in more accurate distance measurements, higher dependability, and better acoustic echo response.

Accordingly, there remains a need for improving the ringing characteristics of transducers to realize improved performance and the other benefits in time of flight ranging systems and/or ultrasonic based level measurement systems.

BRIEF SUMMARY OF THE INVENTION

The present invention provides a method and apparatus for damping a transducer suitable for time of flight ranging systems and/or level measurement systems.

In a first aspect, the present invention provides an ultrasonic transducer suitable for use in a level measurement system, the ultrasonic transducer comprises: a damper component; a transducer having a surface for coupling to the damper component; the damper component includes a plasma etched surface for bonding to the coupling surface on the transducer.

In another aspect, the present invention provides an ultrasonic transducer suitable for use in a level measurement system, the ultrasonic transducer comprises: a transducer assembly; a damper component; the damper component includes a plasma etched surface for bonding to at least a portion of the transducer assembly, the bonded surface conducts vibrations from the transducer assembly.

In a further aspect, the present invention provides a level measurement apparatus for measuring the level of a material contained in a vessel, the level measurement apparatus comprises: a transducer module, the transducer module includes a transducer for generating energy pulses in response to application of input signals, and the transducer is responsive to receiving energy pulses and converting the received energy pulses into output signals; a transceiver module for transmitting the input signals and receiving the output signals, and the transceiver module includes processing means for processing the output signals and for determining the level of the material contained in the vessel; a communication link for coupling the transducer module to the transceiver module; the transducer includes a damping component, the damping component is bonded to at least some components in the transducer for absorbing at least some vibrations in the transducer, so that ringing in the transducer is reduced.

Other aspects and features of the present invention will become apparent to those ordinarily skilled in the art upon review of the following description of specific embodiments of the invention in conjunction with the accompanying drawings.

BRIEF DESCRIPTION OF THE DRAWINGS

Reference is now made to the accompanying drawings which show, by way of example, embodiments of the present invention and in which.

In the figures like references indicate like elements or components.

DETAILED DESCRIPTION OF EMBODIMENTS OF THE INVENTION

Figure 2:
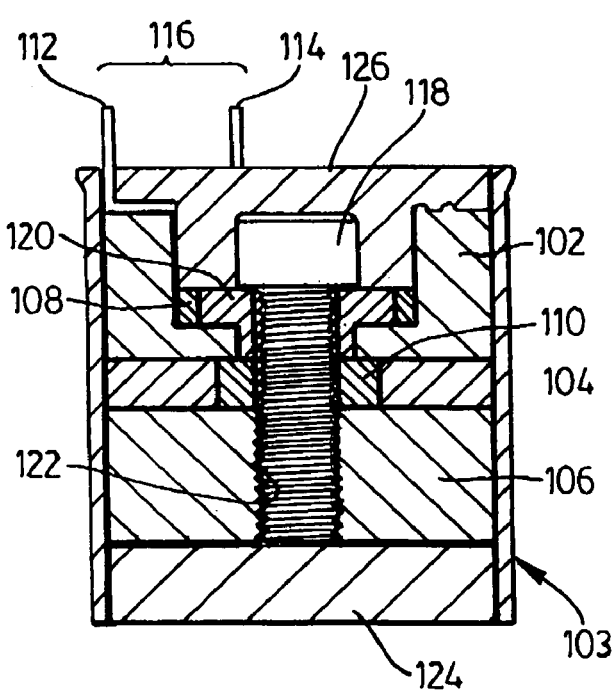
FIG. 2 shows a sectional view of the ultrasonic transducer of FIG. 1 taken along line A—A.
Figure 1:
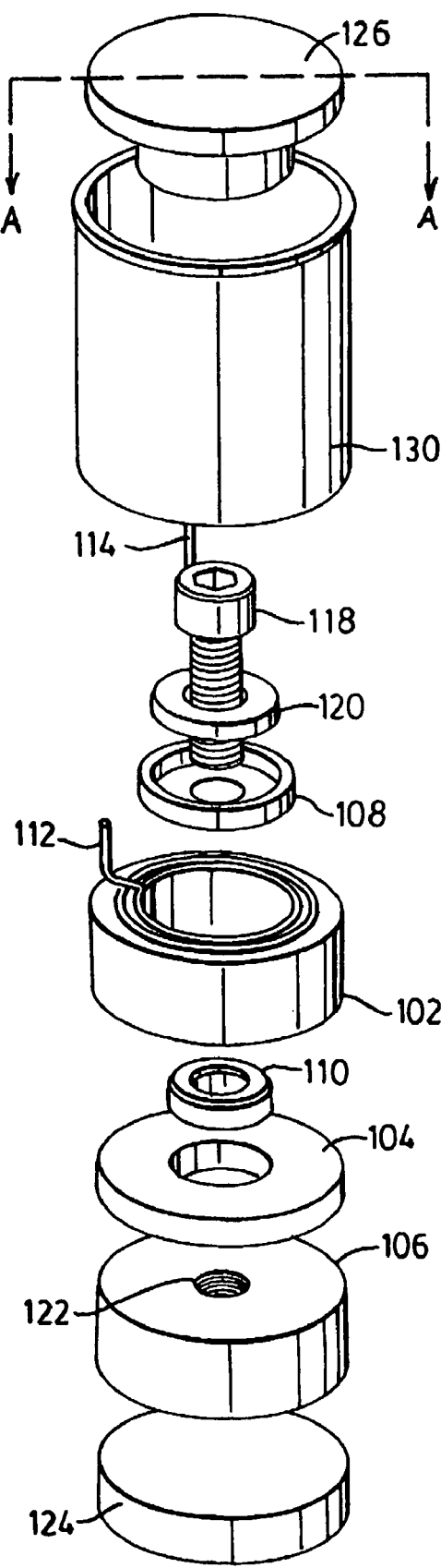
FIG. 1 shows in diagrammatic form, and in an exploded view, an ultrasonic transducer and damping component in accordance with the present invention.

Reference is first made to FIG. 1, and also the sectional view in FIG. 2, which shows an ultrasonic transducer in accordance with the present invention and indicated generally by reference 100. The ultrasonic transducer 100 according to this aspect is suitable for use in a level measurement system as described in more detail below with reference to FIG. 3.

As shown in the exploded view of FIG. 1, the transducer 100 comprises a loading block 102, a ceramic ring 104, a metal disc 106, an insulating cap 108, and a damping washer 110. The ceramic ring 104 is sandwiched between the loading block 102 and the metal disc 106. The ceramic ring 104 includes an interior opening into which the damping washer 110 fits or sits. A metal terminal 112 is coupled to the loading block 102. The metal terminal 112 together with another metal terminal 114 form an input/output port, indicated by reference 116, for applying excitation pulses to the transducer elements and for outputting signals corresponding to pulses (i.e. echoes) detected and converted by the transducer elements.

Referring to FIG. 1, a fastener 118, for example a hex cap screw, holds the transducer components together. For the hex cap screw 118, the metal disc 106 includes a threaded socket, or opening, 122 for engaging the threaded portion of the cap screw 118. A washer 120 sits in the insulating cap 108 and under the head of the cap screw 118. The emitter end of the transducer 100 may include a disc 124. The disc 124 is formed from acoustic conductive material, such as Eccofloat™ band material for an ultrasonic application. The disc 124 couples the ultrasound pulses generated through the excitation of the loading block 102 and the ceramic disc 104 and coupled by the metal disc 122. In this mode, the transducer 100 emits ultrasonic pulses in response to excitation pulses or control signals being applied to the terminals 112 and 114. The transducer also operates in a receive mode where ultrasonic pulses are coupled by the disc 124, the ceramic disc 104 and the loading block 102 and converted into output, e.g. electrical, signals at the terminals 112 and 114. The other end of the transducer 100 includes a sealing cap 126. The sealing cap 126 may be formed from an adhesive, such as Jet Melt 3789 brand adhesive.

According to this aspect of the invention, the transducer 100 includes a damping component indicated by reference 130. The damping component 130 comprises a cylindrical sleeve formed of an elastomer, such as silicone rubber. The silicone rubber sleeve 130 fits over the exterior of the transducer and serves to dampen or reduce ringing in the transducer 100 by absorbing and dissipating the energy associated with vibrations in the transducer 100. To improve the damping characteristic of the silicone rubber damping component 130, the silicone rubber is plasma etched. The plasma etching of the silicone rubber sleeve 130 provides a surface which will bond with the metal disc 106 to absorb vibrations and thereby reduce the effects of ringing in the transducer 100, i.e. the blanking interval.

The plasma etching process involves subjecting the silicone rubber sleeve 130 to a plasma (i.e. charged gas). This results in a chemical reaction between the surface to be etched, i.e. the surface of the silicone rubber sleeve 130, and active ions in the plasma. A suitable plasma for etching silicone rubber comprises $CF_4+e$ or $CF_3+e$. According to this aspect, the plasma etching process comprises exposing the silicone rubber sleeve 130 or the surface, or a portion of the surface, for approximately 10 minutes for a plasma having a composition of 5% hydrogen and 95% nitrogen, and then a purge for approximately 3 minutes at a concentration of 100% nitrogen.

The plasma etching process results in a chemical reaction between the surface of the silicone rubber sleeve and the reactive ions in the plasma. After the plasma etching process, the silicone rubber sleeve 130 is seated on the transducer 100 and glued into place. The driver components are then potted into the housing 322 (FIG. 3) and the transducer is completed.

Figure 3:
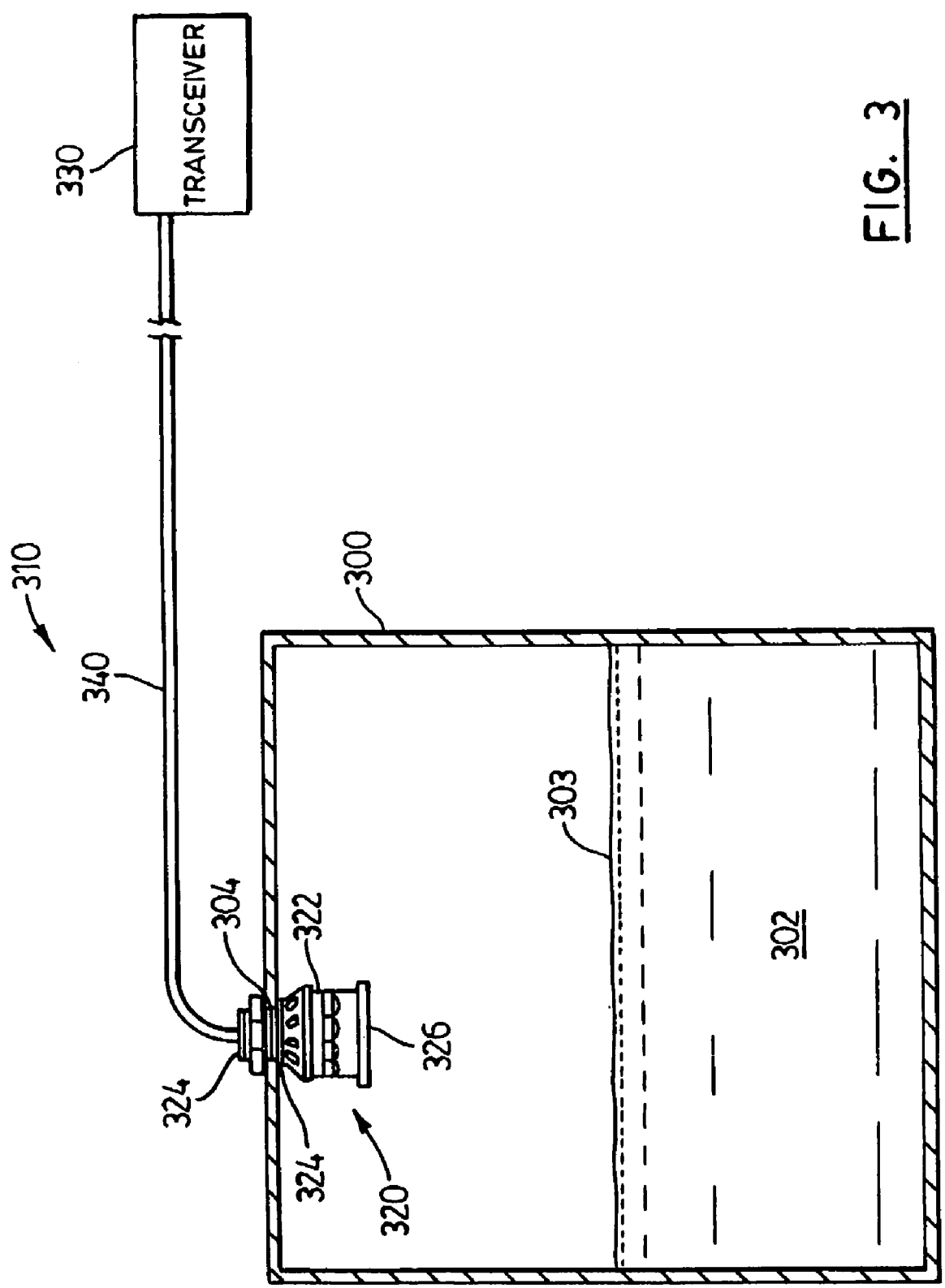
FIG. 3 shows in block diagram a level measurement system utilizing an ultrasonic transducer and damper according to another aspect of the present invention.

Reference is next made to FIG. 3 which shows a level measurement system according to another aspect of the invention and is indicated generally by reference 310. The level measurement system 310 provides non-contactive measurement, and is utilized to determine the distance to a surface capable of reflecting energy pulses, for example the surface of a liquid or granular material 302 contained in a storage vessel or tank 300 (FIG. 3). The distance, i.e. level measurement of the material 302, is determined by transmitting energy pulse(s) and measuring the time for reflected or echo pulse(s) to be received. The level measurement system 300 according to this aspect utilizes an ultrasonic transducer as described above, but may also be based on capacitive or microwave energy pulses.

As shown in FIG. 3, the level measurement system 310 comprises an ultrasonic transducer module 320 and a transceiver module 330. A conductor 340 couples the ultrasonic transducer module 320 to the transceiver module 330. The conductor 340 may comprise a two wire arrangement which provides a link for receiving transmit energy pulses or bursts from the transceiver module 330, and a link for transmitting receive (i.e. echo) energy pulses to the transceiver module 330. The transceiver module 330 includes electronic circuitry and stored-program controlled device(s) for processing the echo signals and determining the level measurements, i.e. the distance to the surface of the material 302. These and other techniques associated with level measurement systems will be familiar and within the understanding of those skilled in the art.

The ultrasonic transducer module 320 is mounted in an access port 304 in the top of the storage vessel 300. The vessel 300 holds the material 302 having a level or depth defined by a top surface indicated by reference 303. The surface 303 of the material 302 serves to reflect the ultrasonic energy which is emitted by the ultrasonic transducer module 320.

The ultrasonic transducer module 320 comprises a housing or enclosure 322 and may include a threaded collar 324 which secures the transducer 320 to the storage tank 300. The ultrasonic transducer 100 (as described above with reference to FIGS. 1 and 2) is mounted or contained inside the enclosure 322. The ultrasonic housing 322 includes an emitter end indicated by reference 326. The ultrasonic transducer 100 (FIG. 1) is mounted in the housing 322 with the emitter disc 124 (FIG. 1) at the emitter end 326. The emitter disc 124 may comprise a sealed composite material or a stainless steel disc, for example, for pharmaceutical or food industry applications. The input/output port 116 (FIG. 1) is coupled to the transceiver module 330 through the conductor cable 340. In response to signals from the transceiver module 330, ultrasonic energy pulses are generated by the ultrasonic transducer 100 and emitted from the end 326 of the transducer module 320 towards the surface 303 of the material 302 contained in the storage vessel 300. Echo pulses reflected by the surface 303 are picked up or received by the emitter disc 124 of the ultrasonic transducer 100 and converted into electrical signals or pulses which are transmitted to the transceiver module 330 for further processing and to determine the level or depth of the material 302 in the vessel 300. The level of the material 302 is determined by measuring the time between the transmit pulse from the transceiver 330 to the surface 303 and the reception of the echo pulse back at the transceiver module 330, and then calculating the distance to the surface 303 of the material 302.

It has been found that the bonding achieved between the silicone sleeve damping component 130 and the metal disc is effective to reduce ringing for both aluminium discs and stainless steel discs. Stainless steel is preferred for use in pharmaceutical and food industry applications. Silicone rubber for the dampening component 130 also provides an inert material which is suitable for such applications.

The present invention may be embodied in other specific forms without departing from the spirit or essential characteristics thereof. Certain adaptations and modifications of the invention will be obvious to those skilled in the art. Therefore, the above-discussed embodiments are considered to be illustrative and not restrictive, the scope of the invention being indicated by the appended claims rather than the foregoing description, and all other changes which come within the meaning and range of equivalency of the claims are therefore intended to be embraced therein.

What is claimed is:

1. An ultrasonic transducer suitable for use in a level measurement system, said ultrasonic transducer comprising:
   a transducer assembly comprising a loading block having a recess for receiving an insulating cap and being coupled to an input terminal; a metal disc coupled to said loading block through a ceramic ring, a damping washer resting in a recess in said ceramic ring and contacting said insulating cap; a fastener securing said loading block, said insulating cap, said metal disc and said ceramic ring;

a damper component comprising a cylinder, said cylinder encircling an exterior surface of said transducer assembly;

said damper component having a plasma etched surface bonding to at least a portion of said metal disc of said transducer assembly, said bonded surface transmitting vibrations from said transducer assembly.

2. The ultrasonic transducer as claimed in claim 1, wherein said damper component comprises silicone rubber.

3. The ultrasonic transducer as claimed in claim 1, wherein said metal disc is formed of aluminium.

4. The ultrasonic transducer as claimed in claim 2, wherein said metal disc is formed of aluminium.

5. The ultrasonic transducer as claimed in claim 1, wherein said metal disc is formed of stainless steel.

6. The ultrasonic transducer as claimed in claim 2, wherein said metal disc is formed of medical grade stainless steel.

* * * * *